No. 870,078. PATENTED NOV. 5, 1907.
A. BLACKMORE.
ELECTRIC SWITCHING APPARATUS AND CONTROLLING APPARATUS THEREFOR.
APPLICATION FILED APR. 2, 1906.

Witnesses,
Edwin D Bartlett
Walter E Pool

Inventor
Alfred Blackmore
per Hubert Lefton Jones
Attorney

No. 870,078. PATENTED NOV. 5, 1907.
A. BLACKMORE.
ELECTRIC SWITCHING APPARATUS AND CONTROLLING APPARATUS THEREFOR.
APPLICATION FILED APR. 2, 1906.

Witnesses

Inventor
Alfred Blackmore

No. 870,078. PATENTED NOV. 5, 1907.
A. BLACKMORE.
ELECTRIC SWITCHING APPARATUS AND CONTROLLING APPARATUS THEREFOR.
APPLICATION FILED APR. 2, 1906.
9 SHEETS—SHEET 3.

Witnesses
Inventor
Alfred Blackmore
Attorney

No. 870,078. PATENTED NOV. 5, 1907.
A. BLACKMORE.
ELECTRIC SWITCHING APPARATUS AND CONTROLLING APPARATUS THEREFOR.
APPLICATION FILED APR. 2, 1906.
9 SHEETS—SHEET 6.

Fig. 7

No. 870,078. PATENTED NOV. 5, 1907.
A. BLACKMORE.
ELECTRIC SWITCHING APPARATUS AND CONTROLLING APPARATUS THEREFOR.
APPLICATION FILED APR. 2, 1906.

Witnesses
Edwin D Bartlett
Walter G Pool

Inventor
per Alfred Blackmore
Hubert Sefton Jones
Attorney

UNITED STATES PATENT OFFICE.

ALFRED BLACKMORE, OF KENSINGTON, LONDON, ENGLAND.

ELECTRIC SWITCHING APPARATUS AND CONTROLLING APPARATUS THEREFOR.

No. 870,078.     Specification of Letters Patent.     Patented Nov. 5, 1907.

Application filed April 2, 1906. Serial No. 309,469.

*To all whom it may concern:*

Be it known that I, ALFRED BLACKMORE, electrician, a subject of the King of Great Britain, residing at 5 Montpelier street, Kensington, in the county of London, England, have invented a new and useful Improved Electric Switching Apparatus and Controlling Apparatus Therefor, of which the following is a specification.

This invention has for its object a system for controlling electric currents of voltages such as are used for lighting, heating and power purposes in buildings of all kinds, the object of the invention being to arrange a magnetic switching apparatus working with low voltage currents and for controlling at a distance the high voltage switches. By this arrangement it is possible to control large currents at high pressures by means of small pushes such as are used in bell work, and the system in accordance with this invention has the advantage that when power is not being consumed all the leads beyond the distributing board in a building will be dead so that danger of short-circuiting and so forth will be largely reduced, and if there is any leakage through imperfect insulation such leakage will not occur when the leads are not carrying a current.

The invention is illustrated in the accompanying drawings in which:—

Figs. 9, 10 and 11 are detail views showing a modified device applicable to the type of apparatus illustrated in Figs. 4 to 8.

Figure 1:
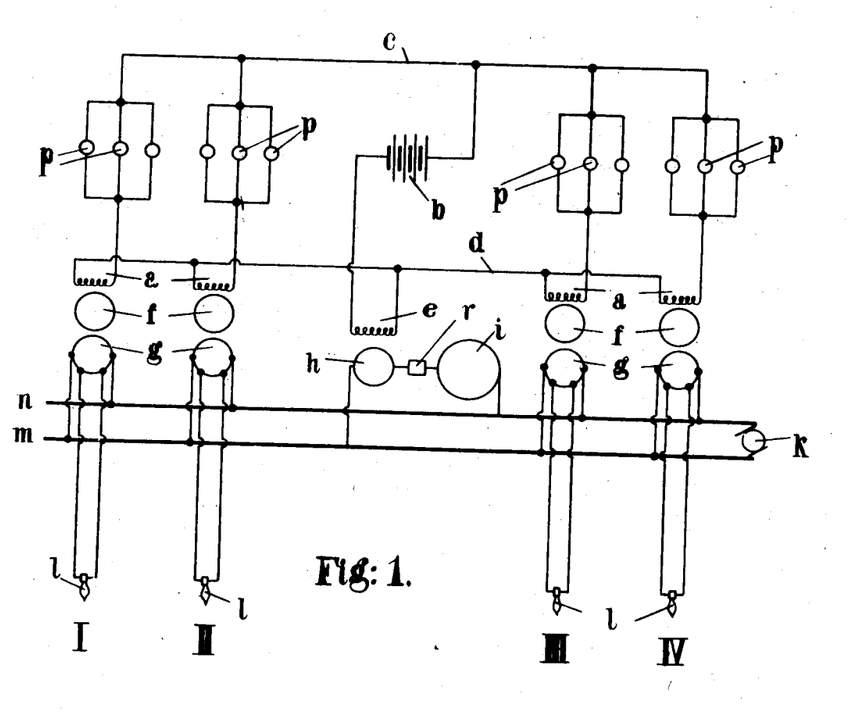
Figure 1 shows a general diagram of the electric circuits.

Referring first to Fig. 1, $a$ are relays, $b$ is a battery, $c$, $d$ are wires, $p$ are suitable push switches or keys, and $e$ is another relay. When any one of the pushes $p$ is operated a circuit is made from battery $b$ through wire $c$, the push $p$, the relay $a$ in series with the push, wire $d$, relay $e$, and back to the battery. The circles $f$ represent trip gears controlled by the respective relays $a$; the circles $g$ represent switches which can only be operated when their trip gears $f$ are operated; the circle $h$ represents a mercury switch or the like controlled by relay $e$. $i$ is a power magnet in series with the switch $h$ through a resistance $r$ (usually an electric lamp) used to adjust the current for the power magnet. $k$ is a source of current supply, for lighting purposes for example, and $m$ $n$ are the mains connected with the source $k$. $l$ are lamps or the like the circuits of which are to be controlled by the switches $g$.

The power magnet $i$ supplies the power for operating the switches $g$, and these switches are such that when operated once they will close the circuits of their lamps $l$ or the like, and when next operated they will break these circuits again. Four sets of relays $a$, trip gears $f$, switches $g$, and lamps or the like $l$, are shown, numbered respectively I, II, III, and IV. Three pushes $p$ are shown in parallel controlling the circuit of each relay $a$; either of these switches, or any number more arranged in parallel with them, could be used independently for controlling the trip gear $f$ and switch $g$ by the relay $a$ in series with them.

The method of operation is as follows: If one of the lamps $l$, that controlled by switching set I for example, is to be switched on to the mains $n$ $m$, one of the pushes $p$ controlling relay $a$ of set I is pressed for a moment, as for ringing a bell. The battery current then flows in series through the relay $a$ of set I and the relay $e$; relay $a$ sets the trip gear $f$ in position to allow switch $g$ of set I to be operated, and relay $e$ causes the mercury switch $h$ to close the circuit of the power magnet $i$. This magnet then operates the switching apparatus but can only move the switch $g$ of set I, the trip gear $f$ of which has been operated. The lamp or the like $l$ of set I is thus switched on to the mains. Other lamps in other sets are similarly switched on by the simple operation of momentarily pressing the pushes $p$ of their controlling circuits, the power magnet returning its apparatus to its normal position after each operation, in readiness for the next. Suppose the lamps of sets I, II and IV to have been switched on in this way. If now the lamp of set II is to be switched off, one of the pushes $p$ of set II is again pressed. This time the power magnet operates the switch $g$ of set II causing it to break the circuit of the lamp in set II. The lamps in the other sets are not interfered with as their pushes $p$ have not been pressed again and their trip gears $f$ have therefore kept their switches $g$ out of the sphere of action of the power magnet apparatus when it has been operated again. If two or more pushes $p$ in different switching sets are simultaneously operated their switches $g$ will be simultaneously operated either to close or to break their lamp circuits, or one to close and one to break said circuits, and so forth.

Having thus indicated diagrammatically what is to be effected by the apparatus in accordance with this invention I will proceed to describe some forms of construction of the apparatus suitable for carrying the invention into effect.

Figure 2:
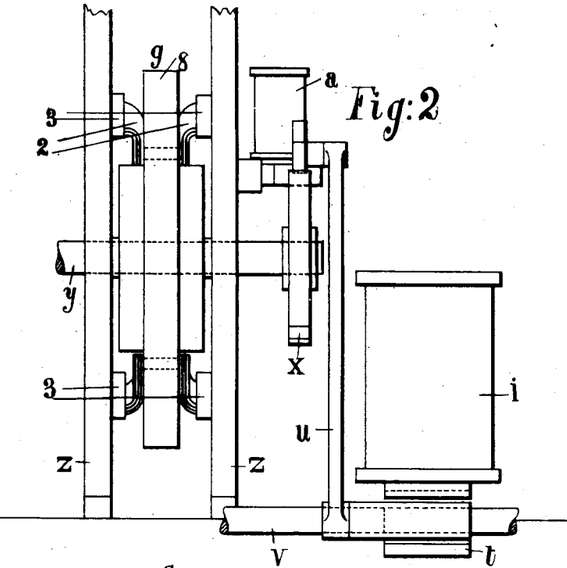
Fig. 2 shows a front elevation, and Fig. 3 a side elevation of one apparatus, or rather of a unit of one apparatus, made in accordance with the invention.
Figure 3:
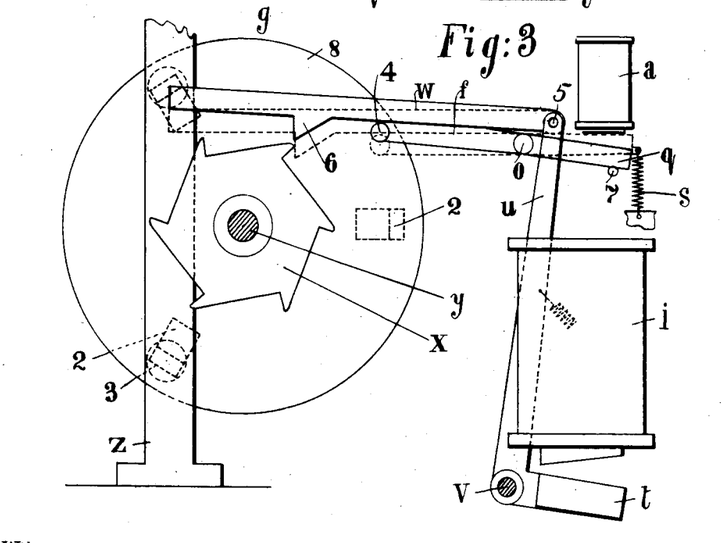
Figure 4:
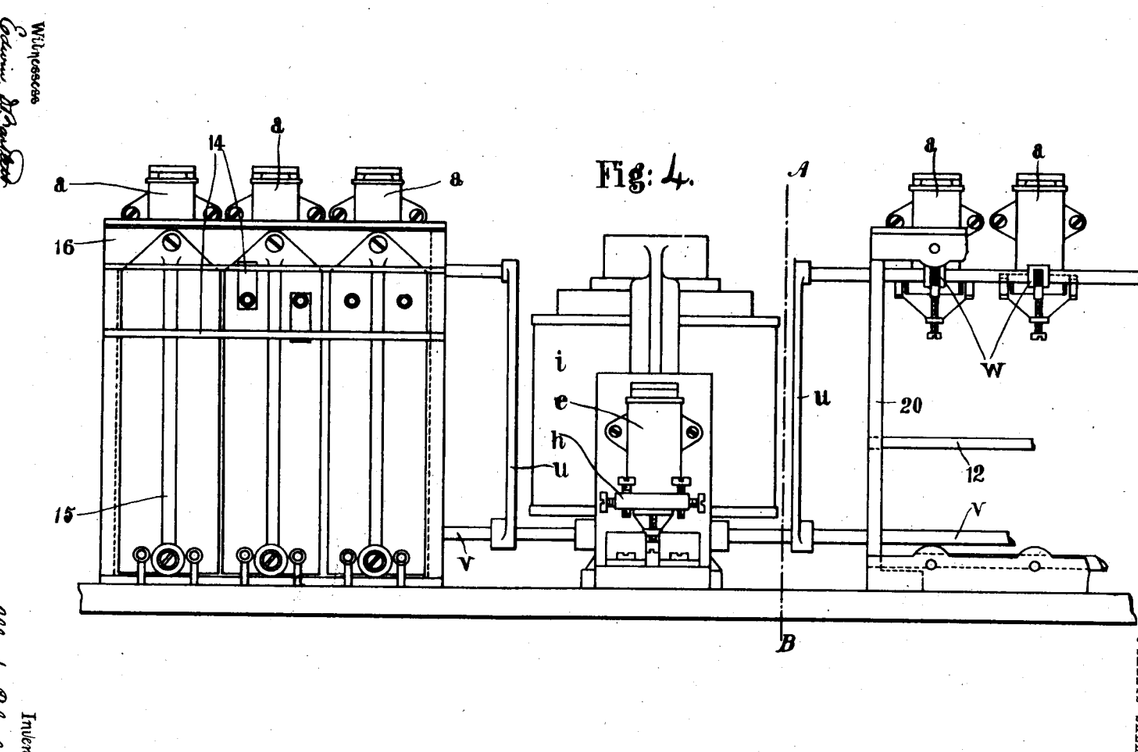
Fig. 4 is a front elevation of a modified form of apparatus (partly broken away) made in accordance with the invention.

The apparatus shown in Figs. 2 and 3 is perhaps the easiest to understand, and will therefore be first described. $a$ is the relay operating a trip gear $f$, consisting in this case of an arm pivoted at $o$ carrying the armature $q$ of the relay $a$, and drawn down by a spring $s$.

The power magnet $i$ has its armature $t$ mounted on a bell crank lever pivoted on a shaft $v$, the upper arm $u$ of said lever carrying a thrust rod $w$ pivoted on it at 5. This rod $w$ rests on a pin 4 projecting from arm $f$ so long as said arm is in the normal position shown in full lines, wherein said arm $f$ is held against a stop 7 by spring $s$. The rod $w$ has a projection 6 thereon which, when the rod is allowed to fall by trip arm $f$, engages with the teeth of a ratchet wheel $x$ mounted on shaft $y$. The shaft carries the switching apparatus ($g$) consisting in this case of a porcelain or like disk 8 carrying pairs of through-connected blades 2 which, as the disk is rotated one sixth of a revolution at a time, alternately close and break circuits through pairs of contacts 3 mounted on framework $z$. In the position of the switch disk 8 shown in the drawing two of its pairs of blades 2 are closing a circuit through contacts 3, the device acting here as a double pole switch. The next time the relay $a$ is energized it will draw up its armature $q$, turning the arm $f$ and allowing the rod $w$ to fall so that its projection 6 comes in front of a tooth of ratchet wheel $x$. Simultaneously the relay $e$ (not shown here) will be operating its mercury switch, and closing the circuit of the power magnet $i$; this magnet will therefore operate a fraction of a second after the relay $a$, giving just time for this relay to cause the rod $w$ to fall. The magnet $i$ draws up its armature $t$ and causes arm $u$ to push the rod $w$ forward. This rod being dropped, its projection 6 turns the ratchet wheel $x$ through one sixth of a revolution thus bringing both pairs of blades 2 away from the contacts 3 and breaking the lamp circuit or the like which is controlled by the switching disk 8. There may be a number of similar switching sets all operated by the one power magnet $i$, and each having a rod $w$ moved by an arm $u$ projecting from shaft $v$ which is rocked by the power magnet. The separate switching sets of course have their own relays $a$ with trip arms $f$ controlled thereby, and their own switch disks 8 which are operated by their rods $w$ when allowed to act by the turning of their trip arms $f$ by their relays $a$. Each switching set when once operated will close the circuit it controls, and when next operated will break the circuit, and so forth, quite independently of what may be the state of affairs in other switching sets operated by the same power magnet $i$.

Figs. 4 to 8 show, in detail, part of a switching apparatus intended to contain six switches of the knife type operated by one power magnet. $a$ are the controlling relays, $f$ the trip arms the cross pins 4 of which hold the rods $w$ up and out of action until said arms $f$ are turned by the relays $a$; $i$ is the power magnet the armature $t$ of which rocks the shaft $v$ carrying arms $u$ and thrust rods $w$ as in the last described construction; $e$ is the relay which operates mercury switch $h$ which in turn controls the circuit of the power magnet $i$. The knife switches $g$ in this case are mounted on rectangular frames 10 pivoted on a rod 9, and the blades of said switches engage in contacts 17 fixed on an insulating wall 16. On the front of said wall 16 are supports for the main leads or busbars 14 ($m$, $n$ Fig. 1) and 15 are fuse blocks carrying fuses for the circuits of switches $g$. The rods 9 carrying the switch frames 10 are supported at their ends in wings 20; rods 12 similarly extend across between the wings 20 and carry frames 11 which are slightly broader than the frames 10 and have tail pieces 13 adapted to press against the vertical arms of said frames 10. Both frames 10 and 11 have cross pieces at the top, as shown, adapted to be engaged by the projections 6 of the thrust rods $w$. 19 is a rod forming a back stop for the frames 10, and 18 are pins on the sides of said frames forming back stops for the frames 11.

Figure 5:
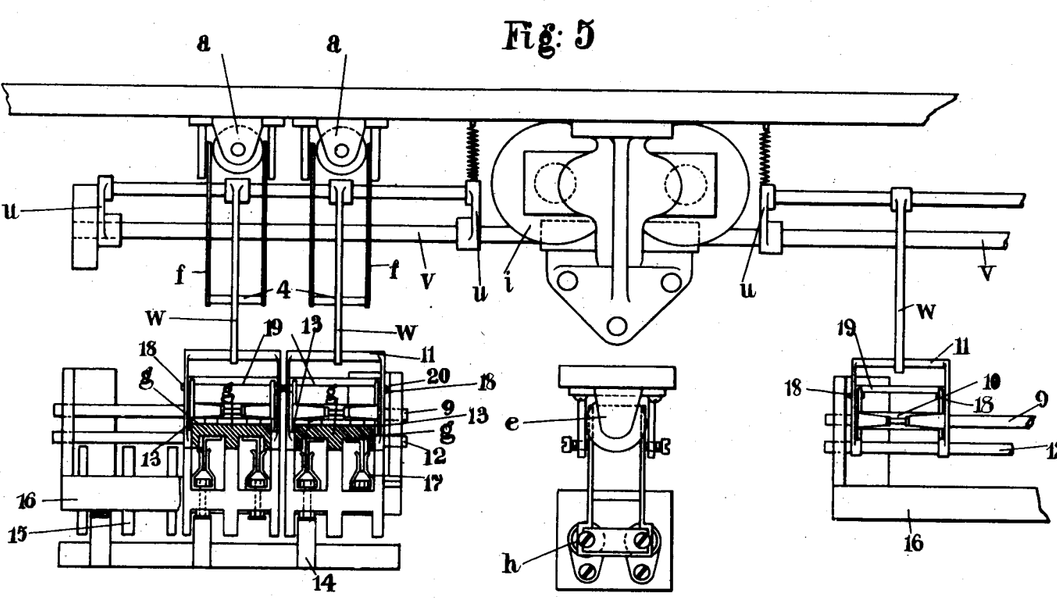
Fig. 5 is a plan view of the apparatus shown in Fig. 4.
Figure 6:
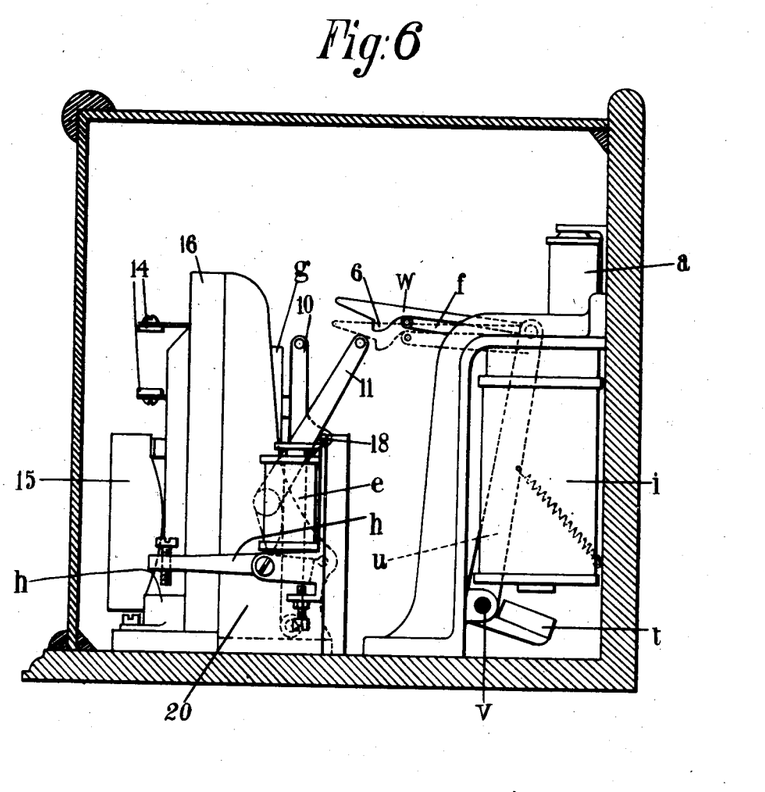
Fig. 6 is a side elevation of this apparatus, in section on the line A—B of Fig. 4.
Figure 7:
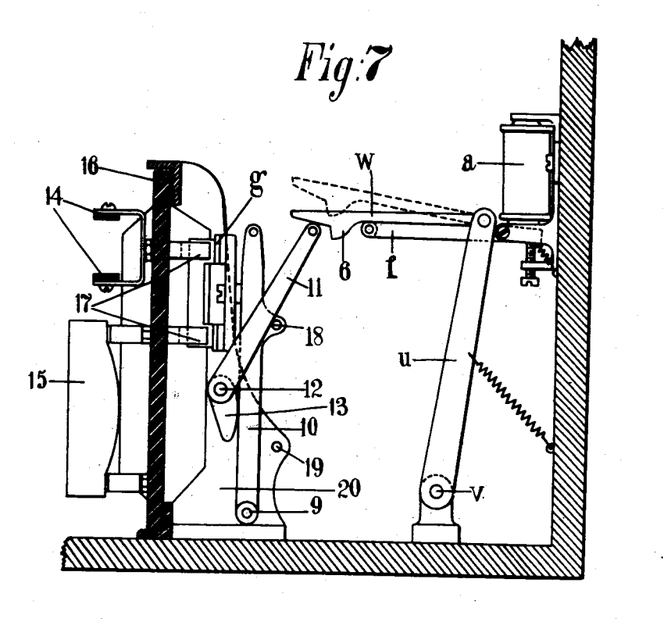
Figs. 7 and 8 are detail views showing one switching set in two positions of operation.
Figure 8:
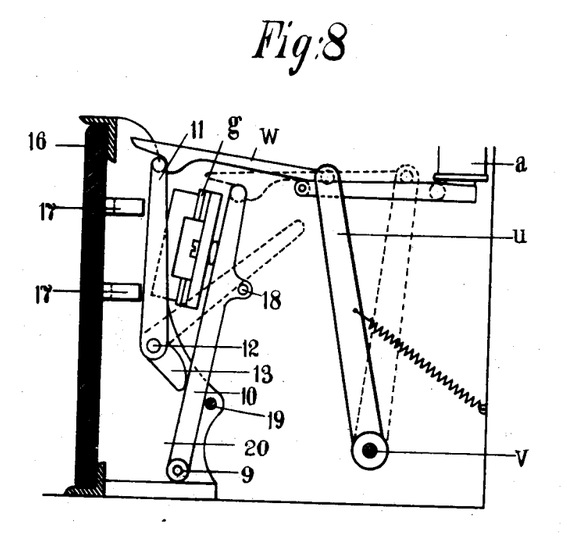

The action of this device will be readily seen from the drawing. In Figs. 5 and 6 all the switches $g$ which are seen are closed in their contacts 17, thus closing their lamp circuits or the like; the parts are at rest and all the thrust rods $w$ are raised by the trip arms $f$. When one of the circuits is to be broken its relay $a$ is energized as before explained dropping arm $f$ and rod $w$ so that the parts come into the position shown in Fig. 7 in full lines. The power magnet $i$ is now energized as the switch $h$ closes its circuit, and the shafts $v$ are rocked turning the arms $u$ and thrusting all the rods $w$ forward. Only the rod that is dropped engages its frame 11 and pushes it forward to the position shown in full lines in Fig. 8; in this action the top bar of frame 11 rises as it turns, thus lifting the thrust rod $w$ with its catch 6 clear of the top of frame 10, while the tail pieces 13 of the frame 11 move back and force backward the frame 10 under rod $w$ to the position shown in Fig. 8, thus breaking the circuit of the switch $g$ controlled by the particular relay $a$ which was energized. If by chance two relays $a$ should have been energized simultaneously their switches would be simultaneously operated. The operator releases the push $p$ (Fig. 1) which he has used directly he sees that the desired circuit has been made or broken; usually the push $p$ is pressed for about half a second, but no harm is done by pressing it for a longer time; when the push is released the relay $a$ and magnet $i$ are deënergized and the rods $w$ return to their former positions, as in Fig. 6; the frame 11 also falls to the position shown by dotted lines in Fig. 8. The next time the relay $a$ of Figs. 7 and 8 is operated it will drop the arm $w$ to the position shown in dotted lines in Fig. 8 wherein the projection 6 will engage the top of frame 10, forcing the latter back and thus forcing its switch $g$ into its contacts 17; simultaneously the pins 18 on frame 10 will raise up the frame 11 to the position shown in Figs. 6 and 7, ready for the next operation of the switch actuating gear. When the push ($p$) which the operator was pressing has been released the parts will all return to the positions shown in Fig. 6. Thus it will be seen that the pressing of any push ($p$ Fig. 1) will alternately cause the switch $g$ which it controls to close and open the desired circuit on the mains. One power magnet can be used in this way to operate a large number of switches; an experimental model on the lines of that illustrated in Figs. 4 to 8 has been made, with twelve sets of switches $g$ arranged in equal numbers on opposite sides of the power magnet $i$; and this model has passed successfully through thorough practical tests. It will be seen that the whole apparatus can be arranged in any convenient place in a building, preferably where the leads from the mains enter it, and the battery circuits with the pushes $p$ therein can be carried to any required parts of the building while the leads from the switches $g$ are taken to the places where the lamps, motor or other apparatus are placed which the switches are to control. The switching on and off will be readily accomplished by the pushes $p$, and whenever the current is not required the high potential wires in the building will be "dead", i. e. they will be quite cut off from the mains. There will therefore be no danger from fire due to breakdown of insulation at night or at times when the main circuits are out of use, and all possibility of leakage in the circuits when out of use will be avoided.

Figure 9:
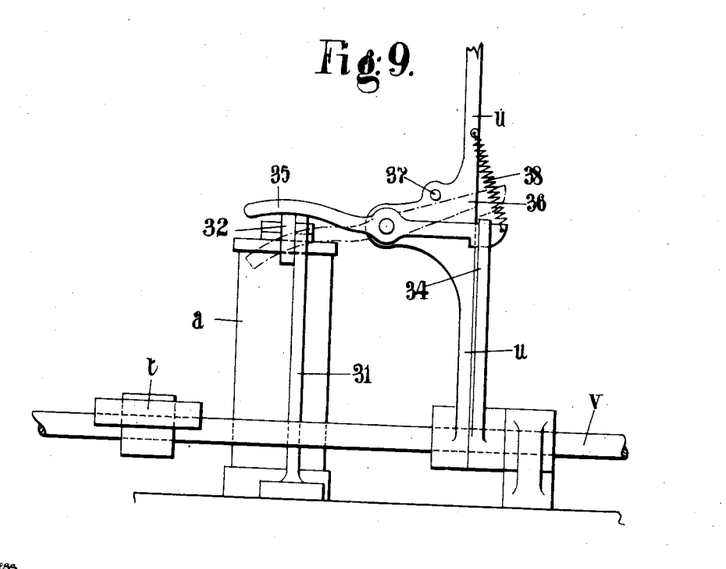
Fig. 9 being a rear elevation, Fig. 10 a side elevation, and Fig. 11 a plan view thereof.
Figure 10:
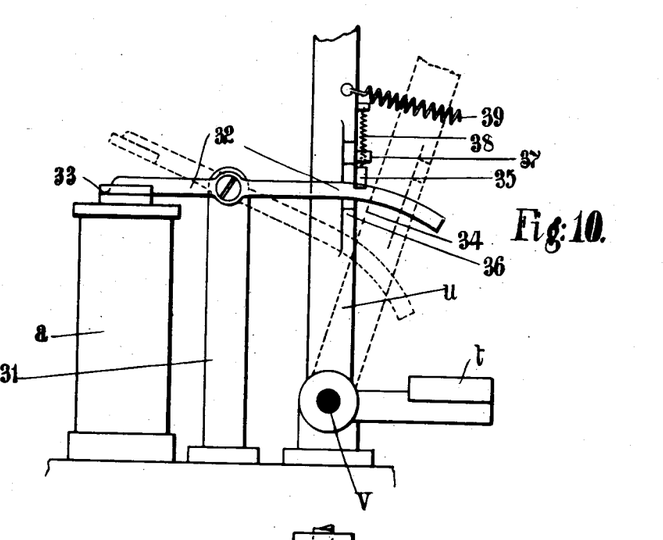
Figure 11:
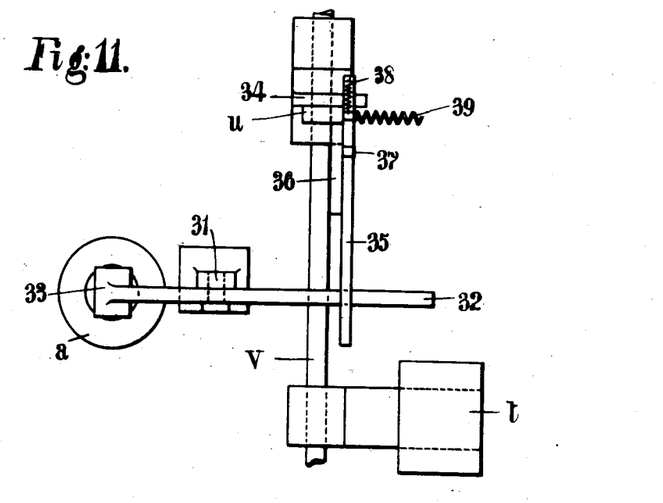

Figs. 9 to 11 show a modification of the apparatus shown in Figs. 4 to 8. The object of the modification is to avoid the working of all the rods $w$ when only one is usually required to operate a switch at any given time. The shaft $v$, operated by the armature $t$ of the power magnet, carries separate, loosely mounted arms $u$ for each thread rod $w$ to be operated. Close to each arm $u$ is an arm 34 slotted at the top, and fixed on the shaft $v$; only one pair of arms $u$ and 34 is shown in the drawing but it will be understood that the device is the same for each switching set; the rods $w$ are not shown, but it will be understood that they are pivoted on the upper ends of arms $u$ as in Figs. 4 to 8. In Figs. 9 to 11 the relay $a$ is mounted on the base and its armature 33 is on the end of a lever 32 which is pivoted on a post 31. The rear end of lever 32 is curved downward as shown, approximately to the curvature of an arc of a circle having its center in $v$. The arm $u$ has a lug 36 on the side thereof on which is pivoted a lever 35; the outer end of this lever bears on the lever 32, and the rear end thereof is pulled upward by a spring 38 and normally lies against the stop 37. The arm $u$ normally occupies (as in Figs. 4 to 8) the rear position indicated by dotted lines in Fig. 10 and is held in this position under the tension of a spring 39. So long as the relay $a$ is not energized the spring 38 draws up the rear end of the lever 35 as indicated by dotted lines in Fig. 9 keeping said lever clear from the slot in the top of arm 34, while also depressing the end of the lever 32 remote from the relay $a$. The arm 34 therefore rocks with the shaft $v$ without influencing the arm $u$. When the relay $a$ is energized it attracts its armature 33 thereby rocking its lever 32 and raising up the outer end of lever 35. The rear end of this lever is thus forced (Fig. 10) into the slot in the top of the arm 34, and when this arm moves the arm $u$ is carried forward with it; the lever 35 rides over the curved surface of lever 32 as the arm $u$ comes forward to the position shown in Fig. 10. When the relay $a$ is deënergized, and the armature 33 is released, the arm 32 may turn again, but the movement near the pivot point of the lever 32 is not sufficient to release the lever 35 from the notch in arm 34, so that the said arm must carry back with it the arm $u$; the spring 39 also insures that the arm $u$ shall return to its rear position under any circumstances.

Finally, it must be understood that this specification is intended to give some suitable examples of construction which are within the scope of the present invention, but the invention is not limited to the constructions shown. Evidently the relays and magnets, trip gear and switches might be arranged in a great variety of ways without materially altering the working of the system. The low potential current for the push circuits might be derived from any convenient source other than a battery. The pushes $p$ might be replaced by clockwork contact makers which would cause the switching sets to operate at predetermined times, such an arrangement being particularly useful for controlling arc-lighting circuits and so forth. Further the switches which are operated by the switching sets might be of any suitable type; the rotary switches (8, Figs. 2 and 3) might for example close any different circuits in each of their different positions and no invention would be required to arrange the contacts for any circuits required to be controlled in this way. The chopper switches (Figs. 4 to 8 etc.) might also be of any known change-over type instead of the simple cut-out and cut-in type shown; no invention being required to substitute one for the other provided the operating mechanism remains the same; in fact, the electrical circuits controlled by the switching apparatus are not limited by this invention and form no part of it. In case only one switch should be required to be operated by a power magnet and thrusting apparatus as hereinbefore described, evidently the relay $a$ and the trip lever $f$ operated thereby might be omitted so that the push circuit would simply include the relay $e$ for controlling the mercury switch or the like; in such case the thrust rod $w$ would always operate the switching mechanism at each closing of the controlled circuit by the push $p$ or the like, and if a chopper switch were used as in Figs. 4 to 8 the circuit through this switch would be alternately closed and broken as the battery circuit is closed time after time through the pushes $p$ or the like.

What I claim is:—

1. In an electric switching apparatus the combination with a power mechanism of an electric switch having a fixed and movable part, an operating mechanism adapted to close and open the switch at alternate operations, a tripping device in conjunction with the switch operating mechanism adapted to control the connection of the power mechanism to that operating mechanism, means for setting in operation the tripping mechanism, and apparatus controlled by said means adapted to set in operation the power mechanism immediately after the tripping mechanism operates.

2. In an electric switching apparatus, the combination of an electromagnetic power mechanism, a switch having a fixed and movable part, an operating mechanism adapted to close and open the switch at alternate operations, an electromagnetic tripping device in conjunction with the switch operating mechanism adapted to control the connection of the power mechanism to that operating mechanism, means for setting in operation any one of the tripping mechanisms, and apparatus controlled by said means adapted to set in operation the power mechanism immediately after the tripping mechanism operates.

3. In an electric switching apparatus, the combination of an electromagnetic power mechanism, a source of electrical power, a relay device adapted to connect said power mechanism to the source of power, an electromagnetic switch, operating mechanism therefor, an electromagnetic tripping device, and means for simultaneously setting in operation said tripping device and the relay device, whereby the switch may be opened or closed by a single movement.

4. In an electric switching apparatus, the combination of an electromagnetic power mechanism, a source of electrical power, a relay device adapted to connect said power mechanism to the source of power, an electric switch, operating mechanism therefor, an electromagnetic tripping device, a local electrical circuit containing in series said electromagnetic tripping device and the relay device, and a plurality of means for closing said local circuit whereby the tripping device and the relay device are simultaneously operated so as to bring the power mechanism into working action to open or close the switch.

5. In an electric switching apparatus, the combination with an electromagnetic power mechanism of a source of power, a relay device adapted to connect said power mechanism to the source of power, a plurality of electric switches, a mechanism in connection with each switch adapted to close and open the switch at alternate operations, an electromagnetic tripping device in connection with each switch operating mechanism adapted to control the connection of the power mechanism to the switch operating mechanism, a local electrical circuit including all the electromagnetic tripping devices in parallel with each other and in series with the relay device, and a plurality of means in the circuit of said electromagnetic tripping devices adapted to close the local electrical circuit for any desired switch, whereby the tripping device for that switch and the relay device are simultaneously operated so as to connect the power mechanism to the operating mechanism of the particular switch and to join the power mechanism to the source of power.

In testimony whereof I have signed my name to this specification in the presence of two subscribing witnesses.

ALFRED BLACKMORE.

Witnesses:
GEORGE JOHNSON,
PERCY GIBBONS.